Feb. 18, 1930.  N. M. HOPKINS  1,747,937
ALTERNATING CURRENT CONVERTER
Filed May 4, 1921  3 Sheets-Sheet
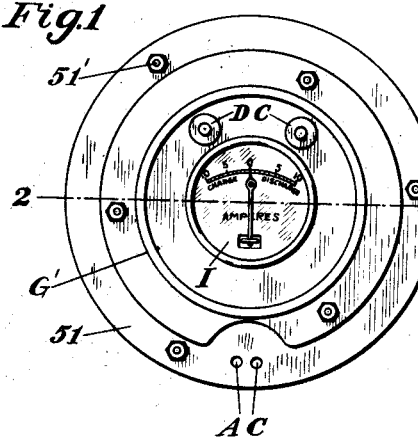
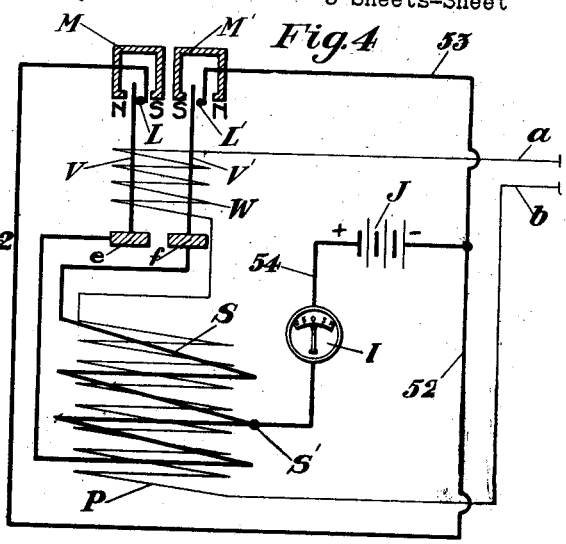
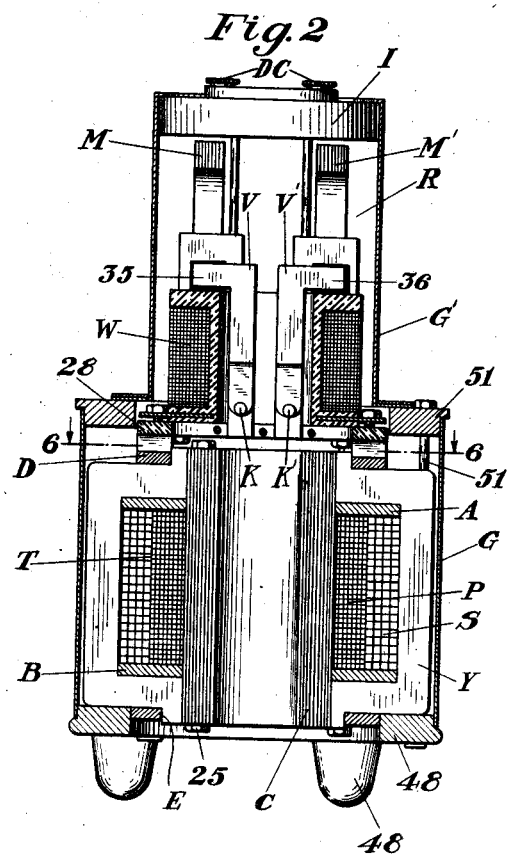
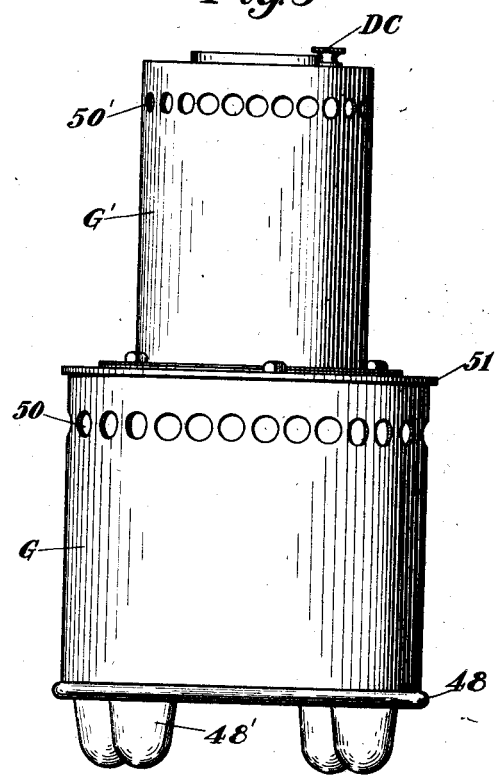
INVENTOR
Nevil Monroe Hopkins
BY
Byrnes Townsend & Brickenstein
ATTORNEYS Feb. 18, 1930.   N. M. HOPKINS   1,747,937
ALTERNATING CURRENT CONVERTER
Filed May 4, 1921   3 Sheets-Sheet 2
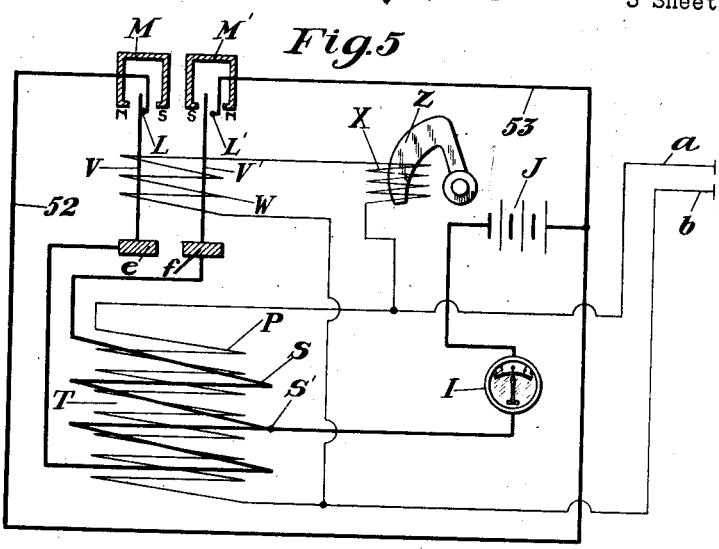
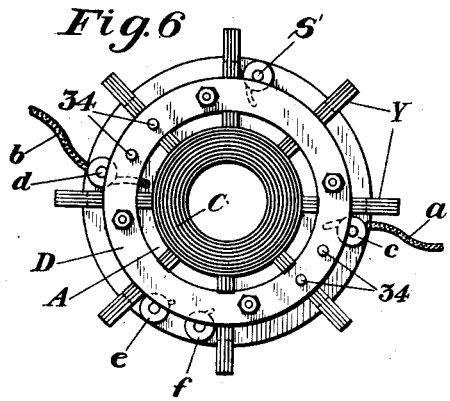
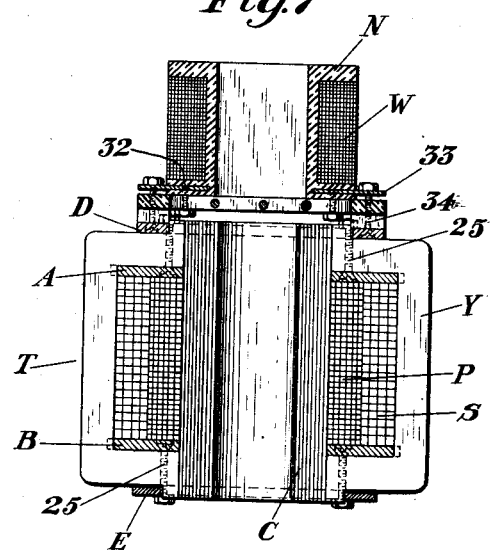
INVENTOR
Nevil Monroe Hopkins
BY
Byrnes Townsend & Brickenstein
ATTORNEYS Feb. 18, 1930. N. M. HOPKINS 1,747,937
ALTERNATING CURRENT CONVERTER
Filed May 4, 1921 3 Sheets-Sheet 3
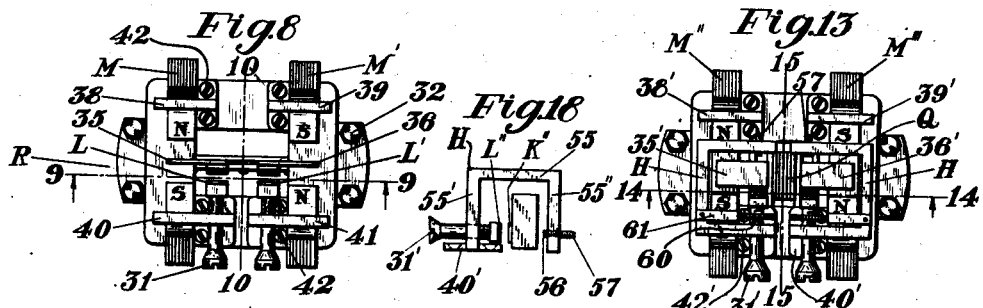
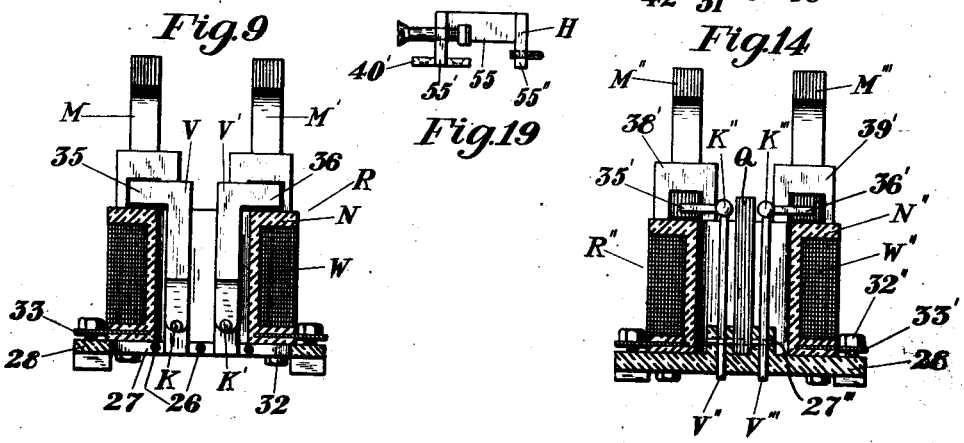
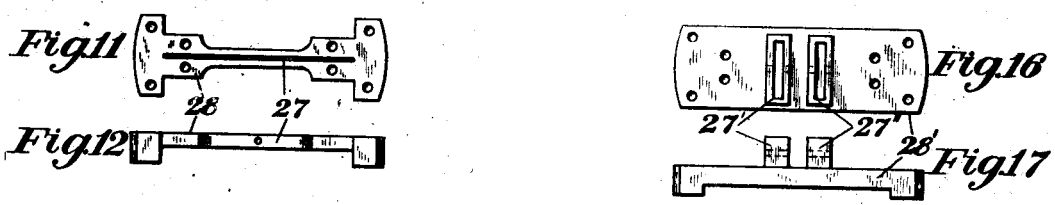
INVENTOR
Nevil Monroe Hopkins
BY
Byrnes Townsend & Brickenstein
ATTORNEYS Patented Feb. 18, 1930

1,747,937

UNITED STATES PATENT OFFICE

NEVIL MONROE HOPKINS, OF NEW YORK, N. Y., ASSIGNOR TO NATIONAL CARBON COMPANY, INC., A CORPORATION OF NEW YORK

ALTERNATING-CURRENT CONVERTER

Application filed May 4, 1921. Serial No. 466,865.

This invention relates to alternating current converters, and particularly to a combined electrical transformer and rectifier adapted to convert both waves of relatively high potential alternating current, of say 110 volts, to relatively low potential direct current, of say 20 to 30 volts, for charging storage batteries and for other purposes.

The principal objects of this invention are to provide an improved current converter that comprises an improved rectifier adapted to rectify both waves of the alternating current supplied to it; also to provide a compact combined transformer and rectifier in which the heat developed in various parts of the device is effectively dissipated and in which variations of the temperature of parts of the apparatus are automatically compensated for.

The above and other objects and the novel features of the invention will be apparent from the following description taken from the drawings, in which Fig. 1 is a top view of an alternating current converter embodying this invention, Fig. 2 is a vertical sectional view of the same, taken on the line 2—2 of Fig. 1, Fig. 3 is a side elevation of the same, Figs. 4 and 5 are diagrams illustrating the arrangement of the wiring and connections of the various parts of the converter, Fig. 6 is a plan view of the transformer, looking down from the line 6—6 of Fig. 2, Fig. 7 is a central vertical sectional view of a transformer with a vibrator magnetizing coil mounted thereon, Fig. 8 is a plan view of a rectifier embodying this invention, Figs. 9 and 10 are sectional views of the same, taken on the lines 9—9 and 10—10, respectively, of Fig. 8, Figs. 11 and 12 are, respectively, plan and edge views of the supporting plate for the vibratory members of the rectifier, Fig. 13 is a plan view of another rectifier embodying this invention, Figs. 14 and 15 are vertical sectional views of the same, taken on the lines 14—14 and 15—15, respectively, of Fig. 13, Figs. 16 and 17 are, respectively, plan and edge views of the supporting plate for the vibratory members of the rectifier shown in Fig. 13, Figs. 18 and 19 are detail views of a supporting yoke employed in the rectifier shown in Figs. 13, 14 and 15, and Figs. 20 and 21 are front and side views of a vibrator adapted to be employed in a rectifier embodying this invention.

Broadly speaking, a double-wave electric converter embodying the present invention comprises a transformer T that is adapted to reduce an alternating current of say 110 volts, common on residence lighting circuits, to a relatively low-potential of say 20 to 30 volts, which when rectified to direct current, will be suitable for supplying current to direct current consuming devices such as storage batteries. The converter also includes a rectifier R which comprises two vibrators V, V' having portions thereof disposed in fixed fields of opposite polarity set up by permanent magnets M, M' or other means, and in the field of an alternating current magnetizing coil W whereby the vibrators simultaneously move in opposite directions in synchronism with the alternating current. The vibrators may be connected to the ends of the secondary winding of the transformer and cooperate with contacts disposed opposite the same sides of such vibrators and connected in circuit with a storage battery or other device to be supplied with direct current. The storage battery or other translating device is also connected to the secondary winding of the transformer and as the vibratory members are operated the circuit is alternately closed therethrough to supply current in the proper direction to the storage battery.

Referring to the drawings, the transformer T, as illustrated, is substantially similar to the one disclosed and claimed in an application, Ser. No. 446,126 filed in my name on February 18, 1921 and it will be understood that while the use of this type of transformer in combination with the herein disclosed rectifier is particularly advantageous, other suitable potential reducing means may be employed in place thereof.

Briefly, the transformer T comprises a core having a main central hollow leg C consisting of a spirally wound strip of magnetic material, and groups of radially disposed yokes Y secured in spaced relation to the central leg C by end rings D and E and intermediate cheek rings A and B, such rings being desirably of insulating material, and the end rings being secured to the inner or cheek rings by suitable means, such as screws 25. The yokes Y are substantially U-shaped and intermediate portions thereof are spaced from the central core leg C to provide an annular space between the cheek rings A and B to receive inductively associated primary and secondary windings P and S. The yokes Y are of metal so as to constitute fins for dissipating heat from the central leg C and the windings P and S, and such yokes may consist entirely of magnetic material to form magnetic links between the ends of the core leg C or may consist in part of magnetic and in part of non-magnetic metal, as for example, some of soft iron and some of brass so as to serve as cooling fins and also produce some leakage flux in the transformer to assist in magnetizing the vibratory members of the rectifier. The passage through the core leg C permits the circulation of air for dissipating heat. The construction and operation of the transformer is described more fully in application Ser. No. 446,126 patented April 5, 1927, No. 1,623,345 and accordingly details need not be described here.

The rectifier R for rectifying the low-voltage alternating current into low-voltage direct current may be associated with the transformer T in any suitable manner, the herein illustrated arrangement being particularly desirable because of its compactness and also because of the cooperative action of the transformer magnetizing field on the vibratory members of the rectifier as well as because of the effective heat dissipating arrangement obtained thereby. In the arrangement illustrated in Figs. 2 and 7 for example, the rectifier is shown as mounted on top of the transformer, substantially coaxial with the transformer.

The rectifier as illustrated in Figs. 2 and 8 to 12, comprises a pair of vibratory members V and V' of conducting, resilient and magnetizable material such as thin strips of soft iron, pins 26 clamping their lower ends in a slot 27 that extends longitudinally of the supporting plate 28. The vibrators V, V' carry contacts K, K' which may be resiliently mounted intermediate the ends of the vibrators and are adapted to cooperate with and engage stationary contacts L, L', respectively carried at the lower ends of spring supporting members 29 secured at their upper ends to blocks 30 which are adjustable, as by means of adjusting screws 31, to vary the distances between the stationary contacts and those on the vibrators.

The vibratory members V, V' are mounted within a hollow flanged spool N, that carries the alternating current magnetizing winding W and may be made of suitable insulating material such as a molded composition, bakelite or the like. The spool N may be secured to the supporting plate 28 by screws 32 which pass into a metal ring 33 molded into the lower flange of the spool. Screws 34 may engage the upper end rings of the transformer and pass through plate 28 into the ring 33 so as to secure the rectifier assemblage to the transformer with the opening in the hollow spool arranged coaxial with the opening in the hollow core leg C to permit the free circulation of air upwardly through the coaxial spaces past the rectifier contacts to cool the core of the transformer, the rectifier contacts and the several windings.

The upper ends of the vibratory members V, V' extend oppositely and outwardly as at 35 and 36, Fig. 9, into the spaces between the poles N, S and S, N of the permanent horseshoe magnets M and M' which are mounted on and secured to the upper flange of the spool N by clamps 38 and 39 and also by clamps 40 and 41. These clamps have bases which may be secured by screws 42 to metal inserts 43 molded in the upper flange of the spool N. The clamps have arms which fit over and are insulated from the inwardly projecting ends of the magnets M, M' to hold the latter rigidly upon the spool N. The arms of the clamps 40, 41 are provided with threaded holes to receive the adjusting screws 31 which carry the stationary contacts L, L'. The pairs of clamps 38, 40 and 39, 41 hold the laminated permanent magnets M, M' in fixed parallel relation on opposite sides of the center of the spool N so that a pair of fixed permanent magnetic fields of opposite polarity will be provided on opposite sides of the center of the spool to cooperate with the upper ends of the vibrators V, V'. Accordingly, when these vibrators are magnetized by the flux induced therein by the winding W, the vibrators will vibrate in synchronism with the alternating current and in opposite directions to alternately close the circuits between the contacts K, L and K', L', such pairs of contacts being on the same sides of the vibrators. When one pair of contacts closes, the other is open and the alternate opening and closing of the two pairs of contacts may be employed to alternately connect portions of the secondary winding to a storage battery.

The combined transformer and rectifier may be enclosed within a metal casing which has a lower enlarged section G that encloses the transformer and an upper reduced section G' that encloses the rectifier. The lower section G carries an inwardly projecting ring 48 upon which the yokes of the transformer may rest to support the transformer, and the ring 48 may be provided with suitable feet 48' to support the converter above a floor or table so that air may enter the lower end of the hollow core C, pass through the hollow spool N, laterally between the transformer and rectifier, out through suitable openings 50 and 50' in the casing members G and G' and upwardly between the yokes Y and out through openings 50. The casing members G and G' may be secured together by a ring 51 that rests upon the upper edge of the casing G and the end rings 48 and 51 may be secured together by rods 51'. An ammeter I is secured in the top of the reduced casing member G' to close the same and may be connected in circuit with the converter and the battery to indicate the charging rate. Suitable terminals for the alternating current and direct current circuits may be provided, as shown in Fig. 1 for example.

From the wiring diagrams of Figs. 4 and 5 it will be seen that the negative terminal of the storage battery J may be connected to the contacts L and L' by conductors 52, 53, and the positive terminal may be connected by conductor 54 through the ammeter I to the mid-point S' of the secondary winding S. The terminals of the secondary winding S are connected to the vibratory members V, V', respectively, so that as the contacts of the latter alternately engage the contacts L, L', current will be supplied in the proper direction to the storage battery J. The high potential alternating current supply conductors a, b may be connected to a suitable plug having pins for insertion in the sockets A. C. (Fig. 1), which constitute the terminals of the series-connected transformer primary winding P and magnetizing coil W. Terminals e, f connected to the ends of the secondary winding S may have the vibrators V, V' or their contacts K, K' connected thereto in any desired manner. In order to obtain sparkless rectification, the fluxes of the transformer and of the winding W must rise and fall in phase so that the contacts may be adjusted to make and break at zero potential. In the diagram of Fig. 4, the magnetizing winding W is arranged in series with the primary winding P so that as the phase of the current varies the current in the magnetizing winding and the flux produced thereby will always be in phase with the current in the transformer. The reversal of magnetism in the coil W which operates the vibrators V, V', will be in phase with the current in the secondary windings S so that making and breaking of the charging circuit will occur at approximately zero potential and by a careful adjustment of contacts sparking will be practically avoided. In Fig. 5, the magnetizing winding W' is shown as connected in parallel with the primary winding P and in order that the phase of the current therein shall synchronize with the phase of the transformer primary P under all conditions of loading of the latter, a suitable adjusting means may be provided in the parallel circuit that includes the winding W', such as a variable impedance, consisting of a series coil X and and a soft iron or other magnetic member Z movable into and out of the field of the coil X to vary the impedance of this circuit as desired. The reversal of the field of winding W' will then occur at points of zero potential of the secondary circuit.

The construction of the rectifier disclosed in Figs. 1 to 14 inclusive may be varied in some respects without departing from the principles of this invention and in Figs. 13 to 19 an improved double-wave rectifier and details of the construction thereof are disclosed which in some particulars is a more desirable construction than the rectifier shown in the previous figures, in that in this arrangement the expansion and contraction of parts of the rectifier due to temperature changes are more effectively compensated for, so that initial adjustments are automatically maintained under all conditions of operation.

Referring to Figs. 13 to 19 inclusive, the rectifier R'' comprises a hollow spool N'' carrying a winding W'' in all essential respects substantially similar to the spool and winding disclosed in the previous figures. The bottom flange of the spool N'' has a metal flange 33' molded therein whereby the spool may be secured by screws 32' to the supporting plate 28' that carries the vibrators V'' and V'''. The supporting plate 28' may be secured to a base such as upper end ring D of the potential reducing transformer T in any suitable manner or as heretofore described.

The vibratory members V'', V''' may be of substantially rigid magnetizable conducting material, such as soft iron, and are pivoted adjacent the lower ends thereof in slots 27' and 27'' extending transversely of the mounting plate 28', suitable pivot means such as pins 27''' passing through suitable holes in the slotted bosses 27' and 27'' registering with holes in the vibratory members V'', V'''. The rigid vibratory members are in some constructions more desirable than flexible vibratory members in that such rigid pivoted members have no vibration period of their own and accordingly vibrate in response to substantially any frequency of the alternating current in the magnetizing winding W''. In the construction shown in Figs. 8, 9 and 10, for example, the flexible vibratory members V, V' have a fixed period of vibration and the frequency of the alternating current in the actuating winding W with which the rectifier R may be used must have substantially the same period as that of the vibratory members or a frequency slightly above or below such period to properly operate these vibratory members, which of course, restricts the use of this type of rectifier.

At their upper ends the vibratory members V″, V‴ carry contacts K″, K‴ adapted to cooperate with contacts L″, L‴ at the inner ends of adjustable screws 31′, carried by the substantially U-shaped metal clamping and contact supporting yokes H comprising parallel limbs 55′ and 55″ and an integral connecting part 55. Referring to Figs. 13, 15, 18 and 19, it will be seen that the adjusting screws 31′ are adjustably threaded in the limb 55′, the opposite limb 55″ carrying an adjustable insulating stop 56 formed by the insulating end of an adjusting pin 57 that is threaded therein. Accordingly, by adjusting either the contact carrying screws 31′ or the pins 57 or both, the stationary contacts and the stationary stops may be accurately adjusted so that the making and breaking of the circuits will occur at the proper instants. Subsequently during the operation of the rectifier, and as the contacts and vibratory member become heated and expand, the intermediate part 55 will elongate correspondingly and the oppositely disposed stationary contact and stop on each yoke will separate a distance that is substantially equal to the expansion of the vibratory member and its contact, thereby automatically compensating for temperature variations in these parts of the rectifier. This is an important feature of my improved rectifier since it then becomes unnecessary to contantly adjust the parts of the rectifier to render the same operative for all frequencies and all conditions of operation. The clamps 38′ and 39′ are constructed and arranged to engage and hold the permanent magnets M″ and M‴ and portions of the mountings H also engage these magnets and assist in holding them in place, such mountings having bases 40′ on the limbs 55′ thereof whereby screws 42′ may secure them to the spool N″. Each of the adjusting screws 31′ may be held in its adjusted position by suitable means, such as a ratchet wheel 60 fixed on the screw engageable by a projection on a spring 61 secured to some relatively fixed member, as the mounting H. The screws 31′ may then be adjusted manually but will not work loose accidentally. Other methods of obtaining temperature compensation may of course be employed.

The pair of fixed parallel permanent magnets M″ and M‴ are disposed on opposite sides of the longitudinal center of the rectifier and arranged so as to set up parallel constant, fixed magnetic fields of opposite polarity, in all essential respects similar to the fields of opposite polarity already disclosed. The upper ends of the vibratory members V″ and V‴ have oppositely and laterally extending magnetizable parts between the poles of the permanent magnets M″ and M‴. Accordingly, as the alternating magnetic field produced by the winding W″ magnetizes the vibratory members V″, V‴ and alternately induces north and south magnetic poles in the laterally extending parts 35′ and 36′ thereof, the vibrators will simultaneously swing in opposite directions, because of the attraction and repulsion of the poles of the permanent magnets M″ and M‴. Since the contacts L″, L‴ are disposed on the same sides of the vibrators, they will be alternately engaged by the contacts K″, K‴, of the vibratory members to alternately close the electric charging circuit through the battery J and in opposite directions through adjacent portions of the secondary winding S of the transformer, thus rectifying both waves of the alternating current to charge the battery. A stationary pack Q of soft iron laminations may be secured in the axis of the coil W″, by the pin 27‴ so as to provide sufficient impedance to obtain sparkless rectification. The vibrators may also be sufficiently massive to afford the required impedance.

It will be understood that while the rectifiers illustrated in Figs. 1 to 19, inclusive, embody vibratory members which are either entirely of resilient magnetizable conducting material or entirely of rigid magnetizable conducting material, vibrators may be employed which are partly of resilient and partly of rigid magnetizable conducting material, as shown for example in Figs. 20 and 21 which are front and side views of a vibratory member V⁴, the lower end of which consists of a resilient stem 62 that is secured to a supporting plate 63 as by a screw 64. The stem 62 carries a rigid part 65 to which the contact K⁴ is secured and a laterally extending part 67 that is adapted to project between the poles of the permanent magnet. The vibratory member V⁴ responds readily to any frequency of the alternating current, is quick acting and because of the weight of the upper portions 65 and 67, its contact K⁴ engages the cooperating stationary contact of the rectifier with a quick or hammer blow that is advantageous in certain types of rectifiers. A yielding spring may also be employed between the vibrator or hammer-head and the contact as shown in Fig. 10 for example, as excellent results are also obtained by such yielding contacts.

It will be understood that various features of the herein-disclosed converter may be modified without departing from this invention.

I claim:

1. An electric current rectifier adapted to rectify both half waves of an alternating current comprising in combination, means for producing a plurality of separate constant magnetic fields of opposite polarity, vibratory members in said fields, and means for producing an alternating magnetic field adapted to magnetize said vibratory members, whereby the same are vibrated simultaneously and in opposite directions substantially in synchronism with said alternating field.

2. An electric current rectifier adapted to rectify both half waves of an alternating current comprising in combination, a plurality of permanent magnets arranged to produce a plurality of separate constant and fixed magnetic fields of opposite polarity, vibratory members severally disposed adjacent the poles of said magnets, and means for producing a single alternating magnetic field adapted to magnetize all of said members, whereby they are vibrated simultaneously and in opposite directions substantially in synchronism with said alternating field.

3. An electric current converter comprising in combination, an electrical coil for producing an alternating magnetic field, a pair of vibratory members disposed within said coil and arranged so as to be magnetized by said alternating field, and a pair of permanent magnets arranged on diametrically opposite sides of said field, said vibratory members severally projecting between the poles of said permanent magnets and said permanent magnets being of opposite polarity, the arrangement being such that said vibratory members are vibrated simultaneously and in opposite directions substantially in synchronism with the alternating magnetic field.

4. An electric current converter comprising the combination of means for producing a plurality of fixed magnetic fields of opposite polarity, magnetizable vibratory members cooperating with such means, and a single alternating current magnetizing means adapted to induce changes of polarity in such members, said magnetizing means including the winding of a transformer in series with its circuit and cores consisting of said vibratory members.

5. An electrical system comprising an alternating current circuit, a direct current circuit, vibrators electrically connected directly to said alternating current circuit and arranged to connect said circuits and to constitute cores of an electro-magnet, means for producing a plurality of fixed constant magnetic fields of opposite polarity adapted to cooperate with said vibrators, and means connected in circuit with the primary winding of a transformer for producing an alternating magnetic field adapted to magnetize said members whereby such members are vibrated simultaneously and in opposite directions substantially in synchronism with said alternating field to connect said circuits.

6. An electric current converter comprising vibrating means, means for producing a plurality of constant magnetic fields cooperating with said vibrating means, a transformer in circuit with said vibrating means, and a coil around said vibrators in series circuit with said transformer for producing alternating magnetic flux adapted to magnetize said vibrating means.

7. An electric current converter comprising in combination, vibrating means, means for producing a constant magnetic field adapted to cooperate with said vibrating means, a transformer in circuit with said vibrating means, and a coil in circuit with said transformer and disposed to set up an alternating magnetic field coaxial with the field of said transformer and arranged so as to magnetize said vibrating means whereby the same is vibrated substantially in synchronism with the alternating current in said transformer.

8. An electric current converter comprising in combination, a pair of permanent magnets arranged to produce substantially parallel constant magnetic fields of opposite polarity, a pair of vibrating members severally cooperating with such permanent magnets, and an alternating current magnetizing coil disposed about said members and adapted to magnetize the same, whereby they are vibrated simultaneously and in opposite directions substantially in synchronism with the alternating field.

9. In an electric current rectifier, the combination with a substantially U-shaped mounting having a permanent magnet attached thereon, of an adjustable contact on one limb of said mounting, an adjustable stop on the other limb of said mounting, a vibrator arranged to operate between said contact and said stop, and means for actuating said vibrator, the arrangement being such that the expansion and contraction of the vibrator between said contact and said stop will be automatically compensated for by the expansion and contraction of the mounting.

10. An electric current rectifier comprising in combination, a hollow spool, a winding on the exterior of said spool, vibrating means disposed within said spool and adapted to be magnetized by the field produced by said winding, means for producing parallel and opposite magnetic fields to cooperate with said vibrating means, and contact means cooperating with said vibrating means.

11. In an electric current rectifier adapted to rectify both half waves of an alternating current, the combination with a hollow spool, of an alternating current magnetizing winding on said spool, vibratory members having parts disposed in said spool and parts projecting therefrom, permanent magnets disposed on opposite sides of the axis of said spool and arranged to produce fixed substantially parallel constant magnetic fields of opposite polarity adjacent the projecting ends of said vibratory members, and contacts engageable by said vibratory members.

12. In an electric current rectifier, the combination of vibrating means having oppositely extending magnetizable portions, contacts arranged to be opened and closed by said vibrating means, and means for actuating said vibrating means comprising alternating magnetic field producing means adapted to magnetize said vibrating means, and means producing a constant magnetic field perpendicular to such alternating magnetic field, such constant field cooperating with said oppositely extending portions.

13. In an electric current rectifier, the combination of vibrating means fixed at one end and having oppositely extending magnetizable portions at the other end, contacts arranged to be opened and closed by said vibrating means, and means for actuating said vibrating means comprising an alternating magnetic field-producing winding disposed around said vibrating means adapted to magnetize the same, and permanent magnetic means cooperating with said oppositely extending portions of said vibrating means.

In testimony whereof, I affix my signature.

NEVIL MONROE HOPKINS.